Sept. 24, 1946.  S. N. WEKEMAN  2,408,247
CAMERA
Filed Dec. 15, 1943  8 Sheets-Sheet 1

INVENTOR.
Stephen N. Wekeman
BY
Ward, Crosby & Heal
ATTORNEYS

Sept. 24, 1946. S. N. WEKEMAN 2,408,247
CAMERA
Filed Dec. 15, 1943 8 Sheets-Sheet 2
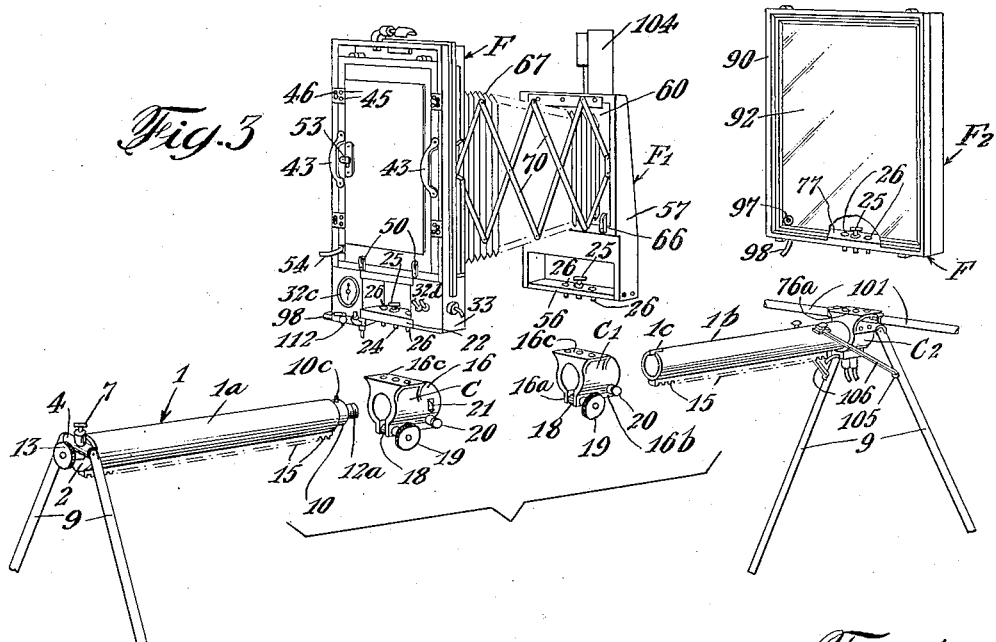
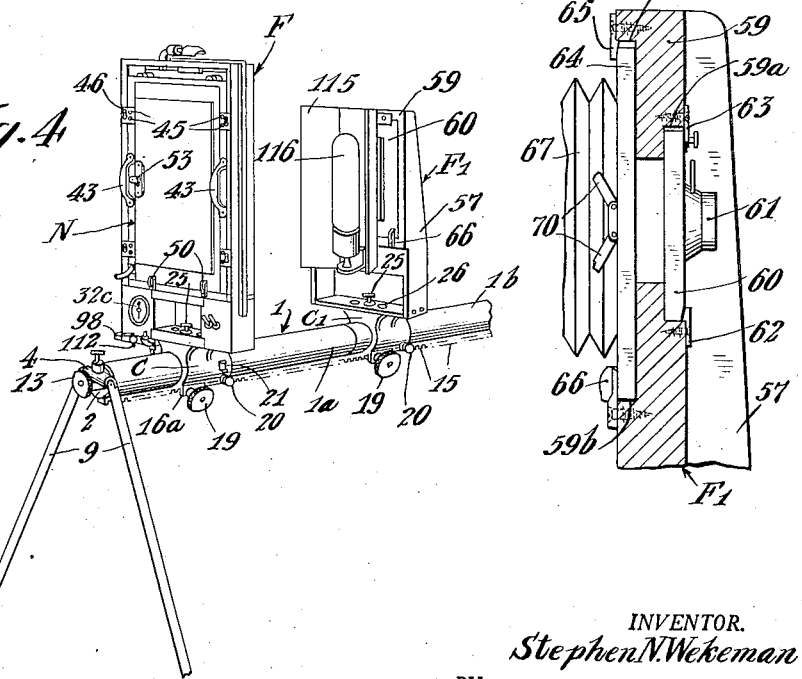
INVENTOR.
Stephen N. Wekeman
BY
Ward, Crosby & Neal
ATTORNEYS Sept. 24, 1946.  S. N. WEKEMAN  2,408,247
CAMERA
Filed Dec. 15, 1943  8 Sheets-Sheet 3
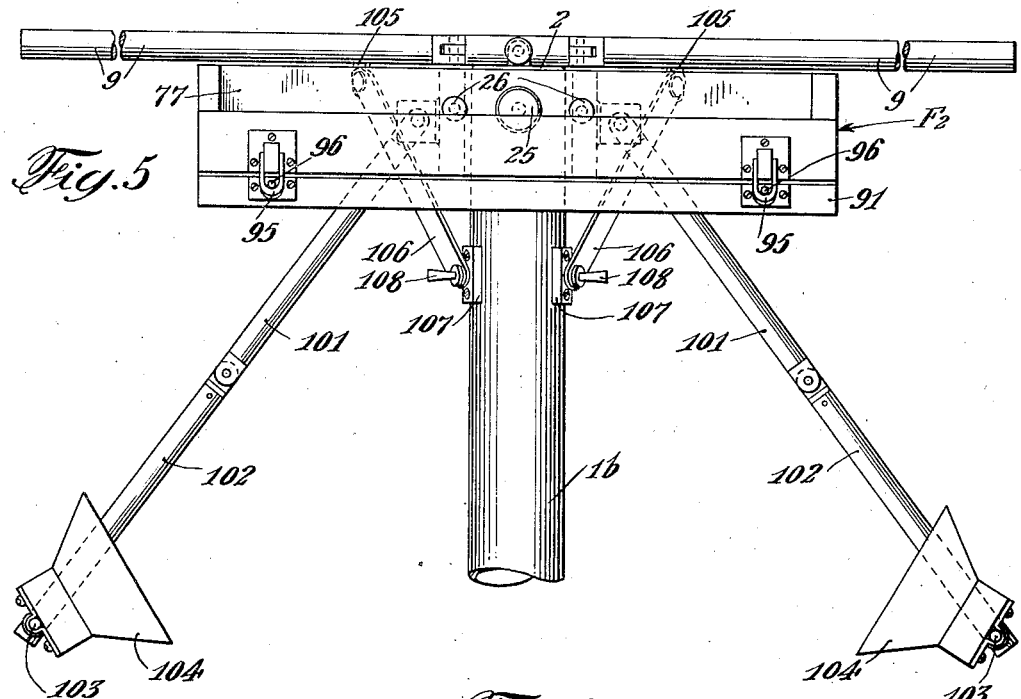
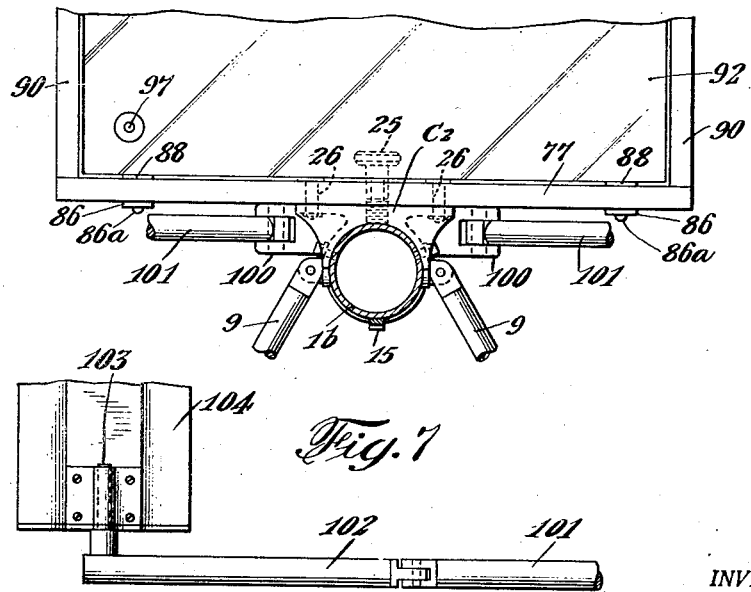
INVENTOR.
Stephen N. Wekeman
BY
Ward, Crosby & Neal
ATTORNEYS Sept. 24, 1946.  S. N. WEKEMAN  2,408,247
CAMERA
Filed Dec. 15, 1943  8 Sheets-Sheet 4
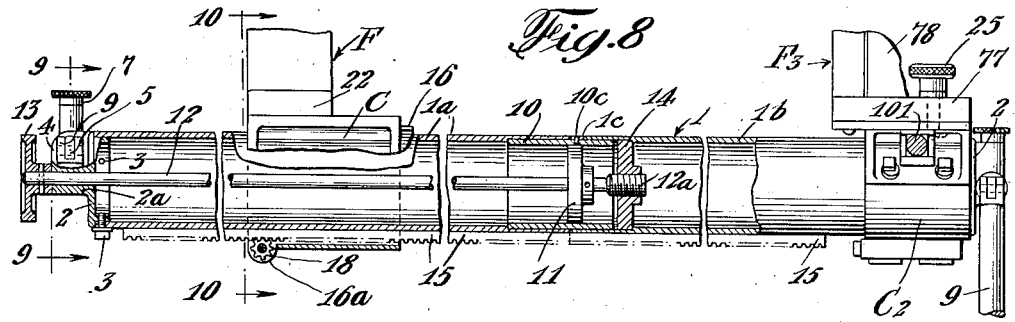
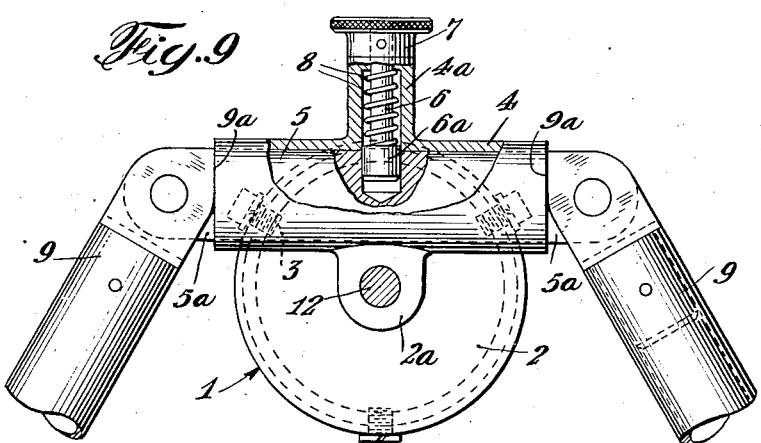
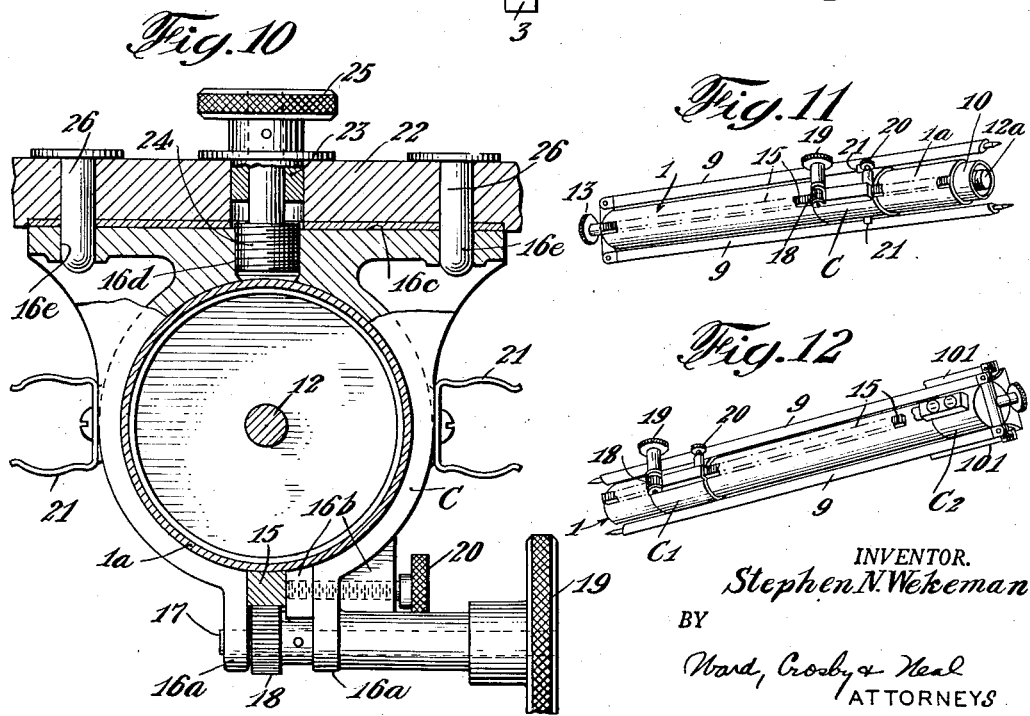
INVENTOR.
Stephen N. Wekeman
BY
Ward, Crosby & Neal
ATTORNEYS

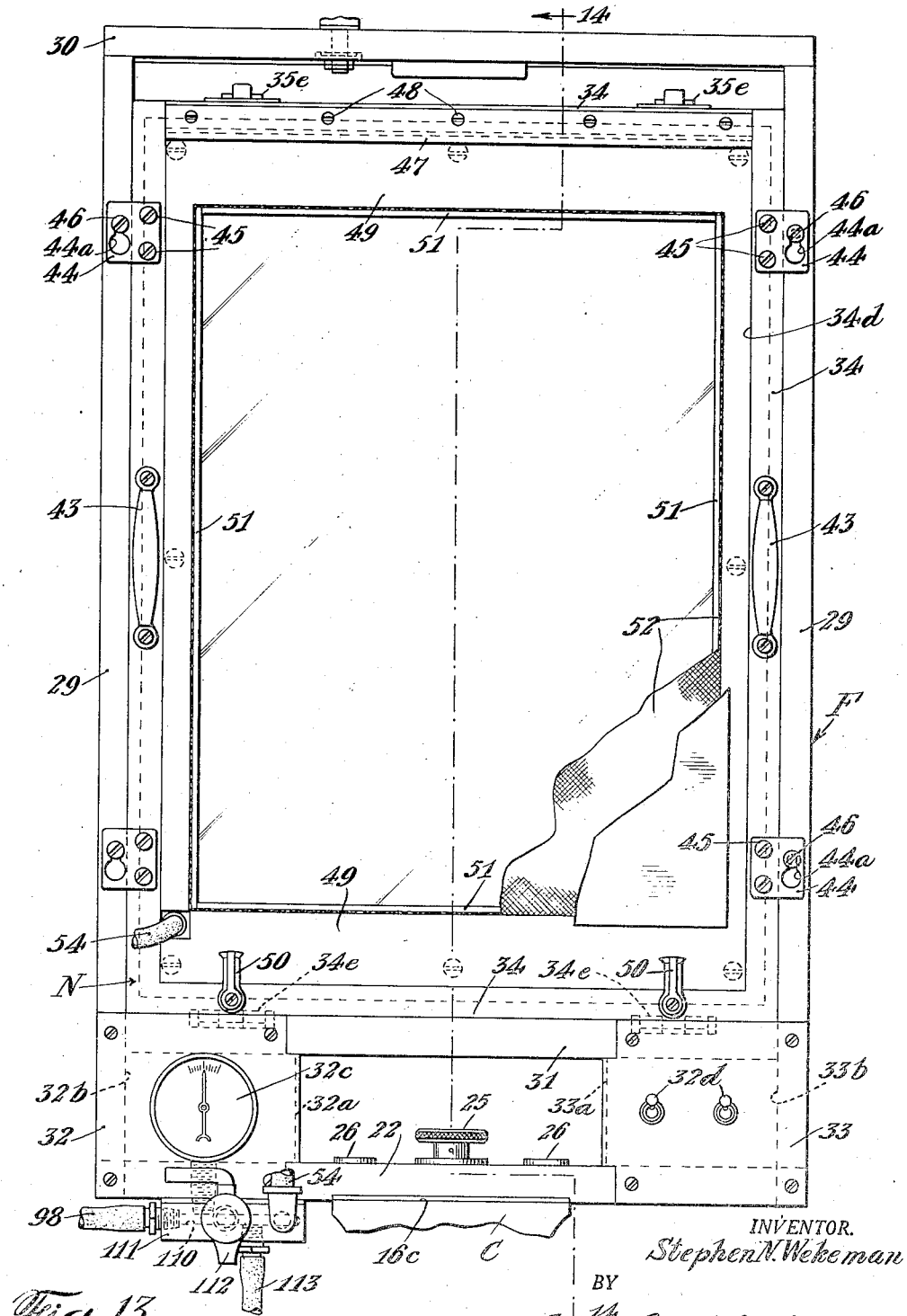

Sept. 24, 1946.　　　S. N. WEKEMAN　　　2,408,247
CAMERA
Filed Dec. 15, 1943　　　8 Sheets-Sheet 6
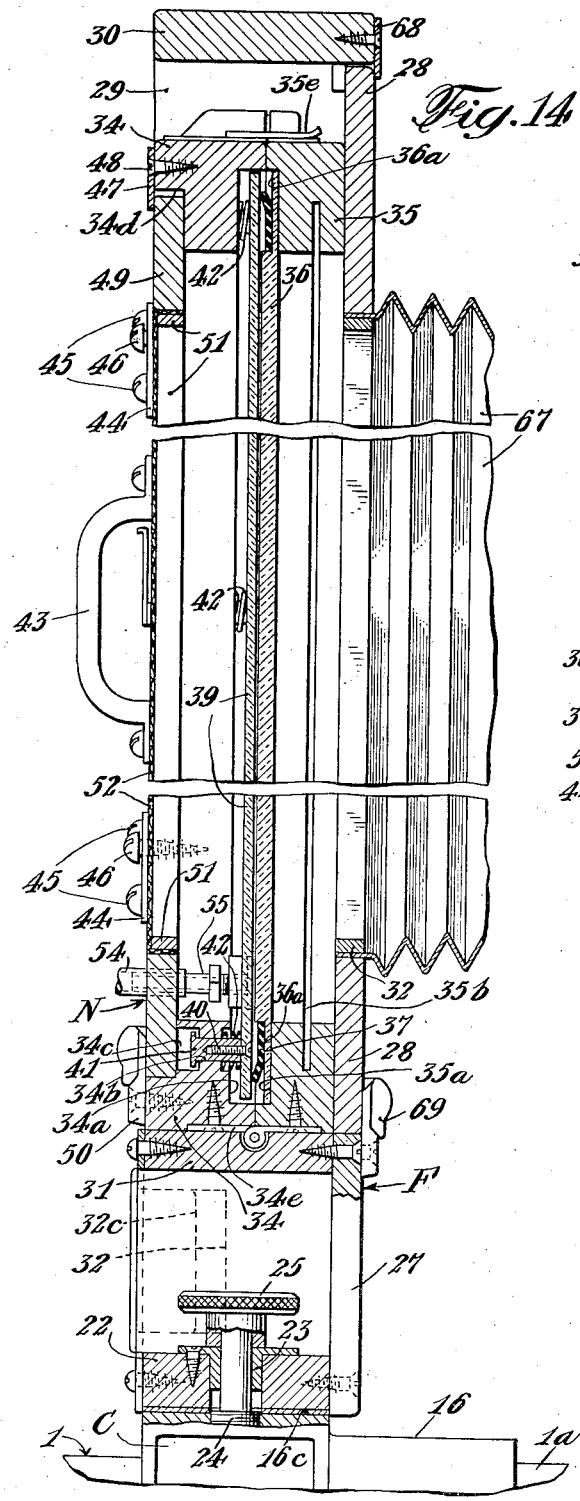
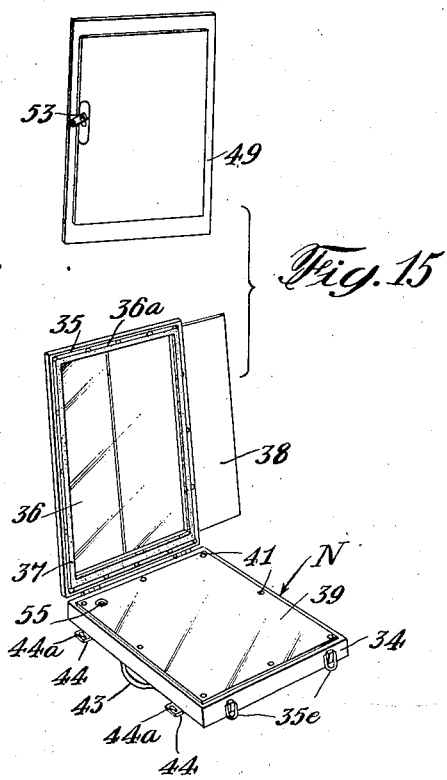
Fig. 14
Fig. 15
INVENTOR.
Stephen N. Wekeman
BY
Ward, Crosby & Neal
ATTORNEYS

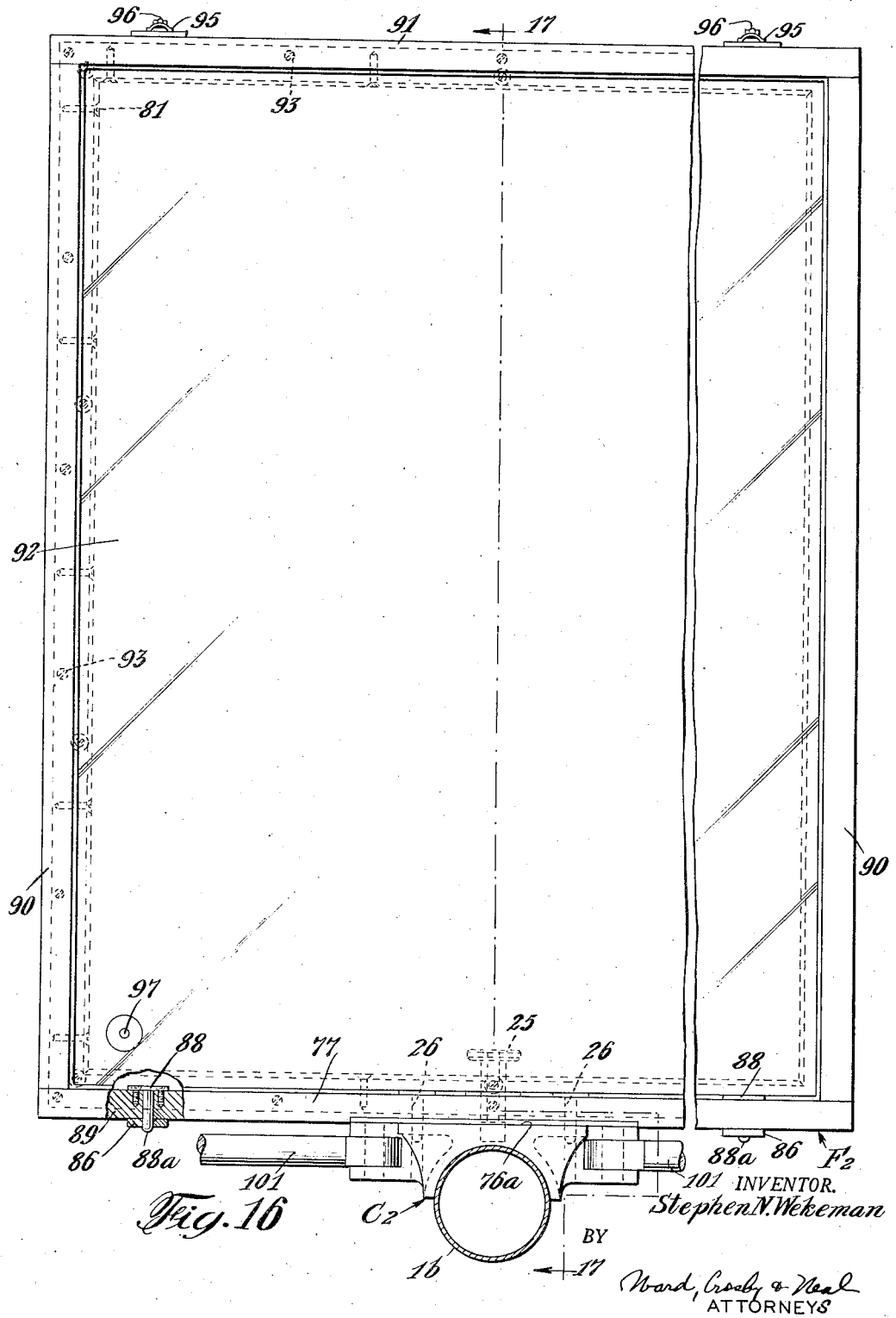

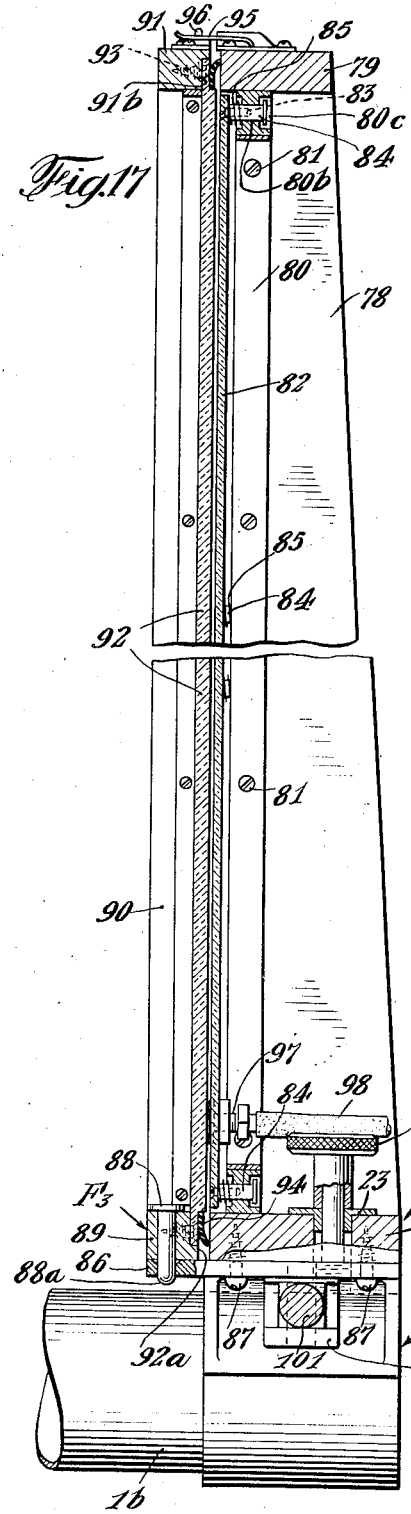
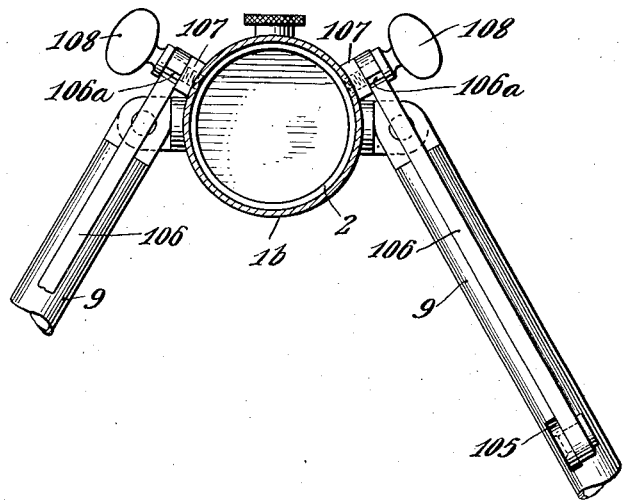
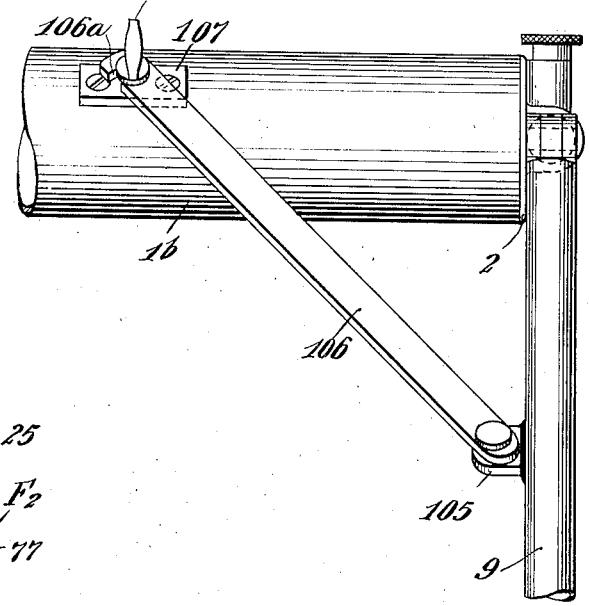

Patented Sept. 24, 1946

2,408,247

UNITED STATES PATENT OFFICE 2,408,247

CAMERA

Stephen N. Wekeman, Saddle River Township, Bergen County, N. J., assignor to Sun Chemical Corporation, a corporation of Delaware Application December 15, 1943, Serial No. 514,311

4 Claims. (Cl. 88—24)

My invention relates to cameras.

My invention has particular reference to a camera which is constructed and arranged in such manner that the operative parts thereof may readily be disassembled when it becomes desirable to pack the camera for transportation and, conversely, the invention is significant in that the separate camera parts may be readily and quickly re-assembled when it becomes desirable to set up the camera for use.

My invention has further reference to a camera which is adapted either for "reflecting" or "through" projection, or for use as a contact printing device as will hereinafter be explained.

With a camera of the character stated or with other types of cameras, my invention has reference to a novel copyholder and to a novel negative carrier both being adapted for camera use and each being adapted for use as a vacuum printing frame.

Various other objects, advantages and features of my invention will become apparent from the following detailed description.

My invention resides in the camera, vacuum printing frame, negative carrier, copyholder, features and arrangements of the character hereinafter described and claimed.

For an understanding of my invention and for an illustration of one of the forms thereof, reference is to be had to the accompanying drawings, in which:

Fig. 3 is a perspective view showing parts of the camera in disassembled relation;

Fig. 4 is a perspective view showing the camera modified to form a contact printer;

Fig. 4a is an enlarged vertical sectional view illustrative of a detailed feature of the invention;

Fig. 5 is an enlarged plan view showing one end of the camera;

Fig. 6 is an elevational view, partly in section, showing the camera as illustrated in Fig. 5;

Fig. 7 is an elevational view showing a lamp support;

Fig. 8 is a vertical sectional view, partly in elevation, illustrating the horizontal camera support and associated parts;

Fig. 9 is a vertical sectional view, partly in elevation, taken on the line 9—9 of Fig. 8;

Fig. 10 is an enlarged, vertical sectional view, partly in elevation, taken on the line 10—10 of Fig. 8 looking in the direction of the arrows;

Figs. 11 and 12 are perspective views illustrating features of the invention;

Fig. 13 is an enlarged elevational view showing one end of my novel camera;

Fig. 14 is a vertical sectional view, partly in elevation, taken on the line 14—14 of Fig. 13 looking in the direction of the arrows;

Fig. 15 is a perspective view showing parts of my novel camera in disassembled relation;

Fig. 16 is an enlarged elevational view, partly in section, showing the camera as illustrated in Fig. 5;

Fig. 17 is a vertical sectional view, partly in elevation, taken on the line 17—17 of Fig. 16 looking in the direction of the arrows;

Fig. 18 is a transverse sectional view, partly in elevation, illustrating a detailed feature of the invention; and Fig. 19 is a side elevational view of the arrangement shown in Fig. 18.

Figure 1:
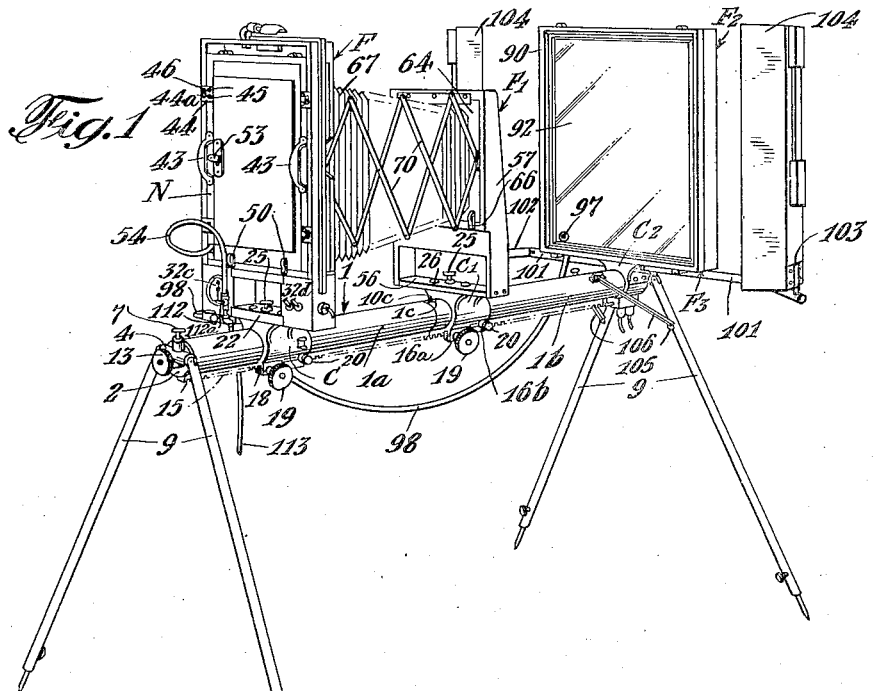
Figure 1 is a perspective view showing the camera of my invention.

Referring to Figs. 1, 2, 3, 8 and 9, I have shown a horizontal tubular supporting structure 1 formed from separable sections 1a and 1b having approximately the same length. The end of the section 1a toward the left is closed by a plate 2 having an inwardly extending flange suitably secured to said section 1a, as by the screws 3. The plate 2 comprises a central tubular section 2a utilizable as hereinafter described. The end of the tubular section 1b toward the right is closed in similar manner by a plate 2 which differs from the first named plate 2 merely in that it does not include a tubular section 2a.

Formed as an integral part of the plate 2 is a horizontal tubular member 4 which comprises a vertical tubular section 4a. A member 5 freely mounted in the tubular member 4 is provided with a central radially extending passage 5a adapted to be alined with the passage formed by said tubular section 4a. A latching member 6 provided with a head 6a adapted to enter the passage 5a is provided with an operating finger piece 7. As shown in Fig. 9, the latching member 6 is biased in a downward direction by a helical spring 8 disposed around the shank thereof.

At each side of the tubular member 4, the member 5 comprises an extending section 5a to each of which is pivoted the bifurcated end of a leg or supporting member 9 for the camera herein disclosed, the upper end of each leg 9 comprising flattened surfaces 9a cooperative with the adjacent end surface of the tubular member 4.

The aforesaid plate 2 of the tubular section 1b has formed integrally therewith a supporting arrangement for the other set of legs 9. This arrangement is a duplicate of that just described and, hence, corresponding reference characters have been applied to the respective duplicate parts.

As shown particularly in Fig. 8, the tubular section 1a, at the end thereof toward the right, has a sleeve 10 projecting therefrom, this sleeve 10 being suitably secured to the interior surface of said tubular section 1a. A disk 11 is doweled or otherwise suitably secured to the sleeve 10 interiorly and transversely thereof, this disk 11, in conjunction with the hereinbefore described tubular section 2a of the plate 2, forming bearings for a shaft 12 having an operating wheel 13 secured to one end thereof. The other end of the shaft 12 comprises a threaded section 12a coactable with a disk 14 transversely secured interiorly of the aforesaid tubular section 1b, said disk 14 being fixed in position in suitable manner, for example, as hereinbefore described with respect to the disk 11. Projecting outwardly from the sleeve 10 is a pin 10c adapted to be received in an open slot 1c formed in the end of the tubular section 1b. This pin-and-slot arrangement is of such character that the tubular sections 1a and 1b necessarily come into proper alinement before being secured together by the shaft 12.

Each of the tubular sections 1a, 1b has a rack member 15 secured exteriorly thereto, these rack members, when said tubular sections 1a, 1b are related to each other as shown in Fig. 8, being in alinement and utilizable as hereinafter described.

In accordance with the invention and referring to Figs. 1-4 inclusive, 8, 10, 13 and 14, the tubular section 1a has freely disposed thereon a collar C which comprises spaced sections 16a forming a passage which receives the aforesaid rack member 15. The collar sections 16a rotatably support a shaft 17 which has secured thereto the hub of a gear wheel 18 disposed in meshing relation with respect to said rack member 15. At its end opposite the gear wheel 18, the shaft 17 carries an operating hand wheel 19. The shank of a locking screw 20 is disposed in threaded relation with respect to one of the collar sections 16a and also with respect to members 16b formed either integrally with or secured to said last named collar section 16a. The end of the screw 20 is adapted to coact with the rack 15 as hereinafter described.

The collar C, at opposite diametric sides, has the respective spring clips 21 suitably secured thereto, these clips 21 being utilizable as hereinafter described.

The collar C comprises a flat upper face 16c and the upper collar section comprises a vertical passage 16d which is interiorly threaded. This central passage 16d is flanked by parallel nonthreaded passages 16e formed in said upper collar section.

Adapted for detachable association with said flat face 16c of the collar C is a frame F which comprises a lower horizontal wall 22 adapted to rest on said flat collar face 16c. Midway between its ends, the wall 22 comprises a vertical passage 23 having a bushing 23 disposed therein. Extending through the bushing 23 is the shank of a screw 24 which is adapted to be threaded into the aforesaid passage 16d in order to retain the frame F on the collar C, said screw shank carrying an operating hand wheel 25. The wall 22 comprises passages disposed on opposite respective sides of the passage for the screw 24, these passages receiving the respective headed pins 26 which, when said frame F is seated on the collar C are disposed in the respective passages 16e.

The aforesaid frame F comprises lower and upper rear walls 27 and 28, Fig. 14, side walls 29, Fig. 13, a top wall 30 and an intermediate wall 31 disposed parallel with respect to and between the walls 22 and 30. All of these walls, with the exception of the wall 28, are secured together in frame-forming relation in any suitable manner, for example, by screws as shown.

The frame F further comprises front walls 32 and 33, Fig. 13, together with the respective transverse walls 32a, 33a associated therewith, these walls together with the adjacent walls forming the respective chambers 32b, 33b. The chamber 32b contains a suitable gauge 32c utilizable for indicating air pressure whereas the chamber 33b contains the actuating mechanism of a pair of electrical switches 32d.

In accordance with the invention, the aforesaid frame F is adapted to detachably support a negative carrier N which, in the form of the invention herein shown, is formed from two oblong sections 34 and 35 pivoted together by hinges 34e and maintained in closed relation by latches 35e. The carrier sections 34 and 35 are formed with the respective facing channels 34a and 35a which extend continuously throughout the length of the four sides of the respective sections 34 and 35. Seated in the channel 35a and secured to the carrier section 35 by screws, or equivalent, is a plate 36 formed from suitable transparent material such as glass or Lucite. The transparent plate 36 is formed with a four-sided channel 36a having an endless four-sided rubber ring 37 seated therein and cemented or otherwise suitably secured to the surfaces defining said channel 36a.

The four sides of the carrier section 35 are channeled as indicated at 35b, Fig. 14, to thereby form a continuous endless channel adapted to receive a sheet 38, Fig. 15, formed from suitable stiff material which is opaque to light rays.

Seated in the channel 34a of the carrier section 34 for movement therein is a plate 39 formed from suitable material such as glass or Vinylite. In accordance with a feature of the invention, the surface of the plate 39 facing the plate 36 is frosted or otherwise suitably treated so that said plate 39 may be used for focusing purposes in the manner hereinafter described.

As shown in Fig. 14, the plate 39 is drilled for the reception of a screw 40 threaded into and securing a guide member 41 to said plate 39. The guide member 41 is freely slidable in a passage 34b formed in the section 34 and the flanged end of said guide member 41 is freely movable in a recess 34c provided therefor in said section 34. A spring 42 helically disposed around the guide member 41 coacts with the adjacent surfaces of the section 34 and the plate 39. As indicated in Figs. 14 and 15, a plurality of biasing arrangements which are duplicates of the one just described are spaced around the periphery of the plate 39, the springs 42 of such arrangements biasing said plate 39 in a direction from left to right, Fig. 14.

Opposite vertical sides of the carrier section 34 have the respective handles 43 secured thereto in suitable manner and each of the vertical sides last named has a pair of outwardly projecting spaced plates 44 suitably secured thereto, as by screws 45, each plate 44 having a key-hole slot 44a. When the carrier sections 34 and 35 are closed and latched, this assembly is disposed and secured in the frame F by registering the respective large end of the slots 44a with the heads of members 46 secured to the adjacent frame side walls 29 in the same spaced relation as the spacing of the slots 44a. Thereupon, the assembly is moved inwardly and then downwardly to slight extent. In this position, the heads of the respective members 46 are opposite the small ends of the slots 44a and, as a result, the described assembly is detachably retained in its operative position.

The aforesaid carrier section 34 comprises a channel 34d which extends continuously throughout the length of the four sides of said section 34. At the top of the carrier section 34, a horizontal strip 47 is secured thereto by screws 48, or equivalent, Figs. 13 and 14. The strip extends downwardly beyond the adjacent horizontal section of the channel 34d to form a pocket in which the upper side of a frame 49 is detachably received. This frame 49 is a four-sided open structure having configuration corresponding with that of the channel 34d and adapted to be received thereby. The lower horizontal section of said frame 49 is engaged by a pair of latching members 50 rotatably secured to the bottom of the section 34. It will be understood that, when the members 50 are in the position shown in Fig. 13, the frame 49 is secured in its intended position. However, when said members 50 are moved downwardly to sufficient extent, the frame 49 may be detached from the section 34 in an obvious manner.

Secured in suitable manner to the frame 49 are the members 51, four in all, which are disposed closely adjacent the respective inner surfaces of the members forming the four sides of said frame 49. The members 51 anchor in position the end of a collapsible focusing hood 52 of a character well known in the art, said hood 52 being retained in closed position by a latch 53 pivoted to said frame 49.

Referring to Figs. 13 and 14, the lower section of the frame 49 is shown as carrying a flexible tube 54 having extending therefrom an extensible nozzle 55 which extends through the aforesaid plate 39 and communicates with the space between said plate 39 and the adjacent plate 36.

Slidable on the tubular structure 1 is a second collar C1 which, with the exception of the clips 21, is a duplicate of the collar C and has similar operating and locking mechanism associated therewith. Accordingly, corresponding reference characters have been applied to the respective duplicate parts of the collars C and C1.

Adapted for detachable association with the flat upper face 16c of the collar C1 is a frame F1 which comprises a lower horizontal member 56 adapted to rest on said flat collar face 16c. The frame F1 is retained detachably on the collar C1 by a screw-and-pin arrangement which is a duplicate of that described for holding the frame F on the collar C. Accordingly, corresponding reference characters have been applied to the respective duplicate parts of such screw-and-pin arrangements.

The frame F1 comprises vertical standards 57, 57 which are connected by a horizontal member 58 disposed parallel with respect to the aforesaid member 56. Above the member 58, the standards 57, 57 have a plate 59 secured thereto, this plate defining an aperture 59a.

The plate 59 comprises a seat 59b, Fig. 4a, adapted to receive a lens plate 60 to which a suitable objective lens 61 is secured. The lower surface of the lens plate 60 is seated in a pocket formed by a strip 62 suitably secured to the front surface of the plate 59 which also carries a pivoted latch 63 coactable with the upper front surface of the lens plate 61.

The plate 59 further comprises a seat 59b, Fig. 4a, adapted to receive a plate 64 having an aperture 64a alined with the aforesaid aperture 59a of the plate 59. The upper surface of the plate 64 is seated in a pocket formed by a strip 65 suitably secured to the rear surface of the plate 59 which also carries a pair of pivoted latches 66 coactable with the lower rear surface of said plate 64.

Suitably secured to the rear surface of the plate 64 is one end of a bellows 67 as known in the camera art. The other end of the bellows 67 is suitably secured to the aperture-defining surfaces of the hereinbefore described wall 28 of the frame F. This wall 28 is detachably related to the frame F and, to this end, a strip 68 may be suitably secured to the frame wall 30, Fig. 14, whereby there is formed a pocket for the reception of the upper end of said wall 28 which, as shown in Fig. 14, is detachably secured in the position shown by a pair of latch members 69 pivoted to the aforesaid wall 28 of said frame F.

The bellows 67, then, is secured detachably to the frames F and F1. As known in the art, lazy tongs 70 may be secured to the plate 64 and the wall 28 at opposite respective sides of the bellows 67.

Figure 2:
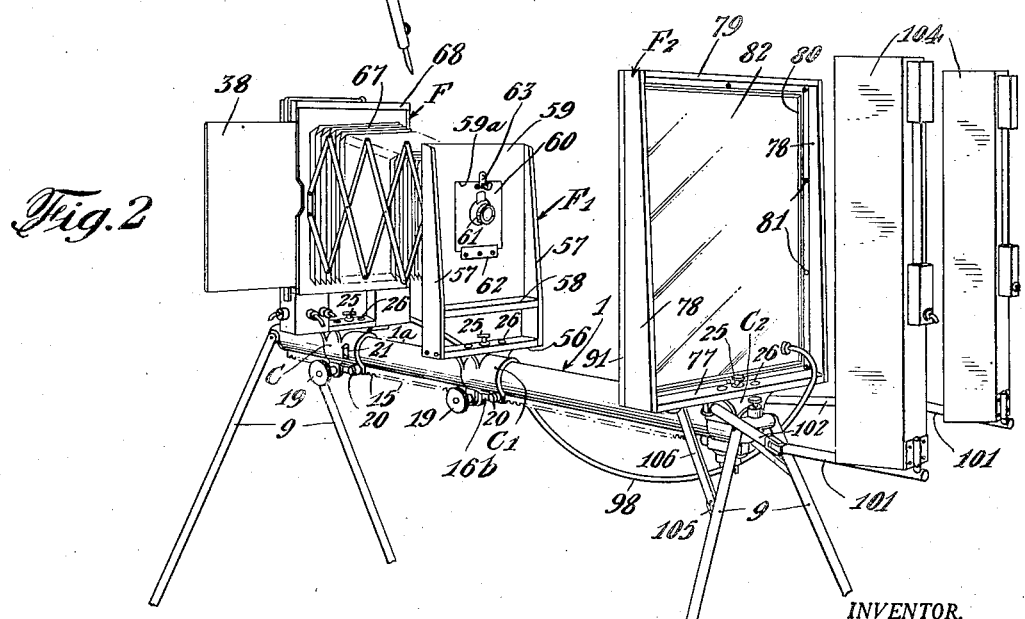
Fig. 2 is a perspective view showing the camera arranged for "through" projection.

Secured in fixed position and in suitable manner to that end of the tubular structure 1 toward the right, Figs. 1, 2 and 3, is a bracket C2 having a horizontal upper face 76a, said bracket C1 carrying a pair of the clips 21. Adapted for detachable association with said face 76a of the bracket C2 is the lower horizontal wall 77 of a copyholder frame F2. The frame F2 is retained detachably on the bracket C2 by a screw-and-pin arrangement which is a duplicate of those described for holding the frames F and F1 on the respective collars C and C1. Accordingly, corresponding reference characters have been applied to the respective duplicate parts of said screw-and-pin arrangements.

The aforesaid frame F2 comprises, in addition to the lower wall 77, vertical side walls 78, 78 disposed in parallel relation and spanned by a horizontal top wall 79, all of the walls of said frame F2 being secured together in frame-forming relation in any suitable manner. The interior surface of each wall of the frame F2 has a member 80 suitably secured thereto, as by the screws 81. These members 80 are disposed in the same vertical plane and form a four-sided open frame. Disposed immediately adjacent this frame formed by the members 80 is a transparent plate 82 formed from suitable material such as glass or Lucite. As indicated at the top of Fig. 17, the plate 82 is threaded for the reception of a screw 83 threaded into and securing a guide member 84 into said plate 82. The guide member 84 is freely slidable in a passage 80b formed in the adjacent member 80 and the flanged end of said guide member 84 is freely movable in a recess 80c provided therefor in said last named member 80. A spring 85 helically disposed around the guide member 84 coacts with the adjacent surfaces of the plate 82 and said last named member 80. As indicated in Fig. 17, a plurality of biasing arrangements which are duplicates of the one just described are spaced around the periphery of the plate 82, the springs 85 of such arrangements biasing said plate 82 from right to left, Fig. 17.

The lower surface of the frame wall 77 has a plurality of spaced members 86 suitably secured thereto, as by screws 87. The members 86 project beyond the frame wall 77 from right to left, Fig. 17, and each member 86 is provided with a vertical passage adapted to receive the depending section 88a of a pin 88. The pins 88 are suitably secured to the lower wall 89 of a copyholder frame F3 cooperative with the copyholder frame F2, said frame F3, in addition, comprising vertical side walls 90, 90 joined by a horizontal top wall 91.

The four walls of the frame F3 are channeled as indicated at 91b, Fig. 17, to thereby form a continuous endless channel adapted to receive a plate 92 formed from suitable transparent material such as glass or Lucite, said plate 92 being suitably secured in position, as by screws 93 threaded therethrough and into the adjacent frame sections. The transparent plate 92 is formed with a channel 92a having an endless four-sided rubber ring 94 seated therein and cemented or otherwise suitably secured to the surfaces defining said channel 92a.

Carried by the top wall 79 of the frame F2 are a pair of spaced latches 95 which are engageable with the respective fixed members 96 upstanding from the top wall 91 of the frame F3, Fig. 5. In this manner, said frame F3 is held positively in the position shown in Fig. 17.

As shown in Fig. 17, the plate 82 is provided with a passage through which a nipple 97 extends, this nipple having secured thereto a flexible tube 98 utilizable as hereinafter described.

The bracket C2, hereinbefore referred to, comprises oppositely extending supports 100, Figs. 5 and 6, for pivotal attachment thereto of the respective arms 101 adapted to move freely in a horizontal direction. Freely pivoted to each arm 101 is a second arm 102 likewise movable in a horizontal direction. Each arm 101, at its free end, carries a vertical pin 103 which supports a vertical housing 104 in which a suitable electric lamp is disposed.

Referring to Figs. 5, 6, 18 and 19, each leg 9 at the right, Fig. 1, has secured thereto a lug 105 to which an arm 106 is pivoted, each arm comprising an angular slot 106a adjacent the free end thereof. The tubular section 1b, on its exterior surface, comprises lugs 107 spaced equidistantly from the longitudinal vertical plane thereof, each of these lugs being threaded for the reception of a screw 108. With the screws 108 retracted to some extent, each arm 106 may be moved in such manner that the slot 106a thereof is engaged with the adjacent screw 108 whereupon, by tightening both screws, the arms 106 are anchored in position to thereby brace the associated legs 9.

The flexible tubes 54 and 98 hereinbefore described communicate with a passage 110, Fig. 13, formed in a housing 111 having a valve 112 associated therewith. Communicating with the passage 110 is a flexible tube 113 which leads to a suitable vacuum pump, not shown, operated by a motor, not shown, which may be energized by closing one of the switches 32d, Fig. 13. The gauge 32c, hereinbefore described, also communicates with the passage 110.

In the open position of the valve 112, the tube 54 is connected with the vacuum pump. In the open position of another valve 112a, the tube 98 is connected to said vacuum pump.

In order to place a copy sheet in the copyholder frames F2 and F3, the latches 95 are released so that the frame F3 may be removed from the members 96. Thereupon, the copy sheet is disposed in operative position and the frame F3 re-associated with the frame F2, the springs 85 thereafter biasing the plate 82 from right to left, Fig. 17, to thereby positively hold said copy sheet in engagement with the plate 92. After the valve 112a has been opened to connect the vacuum pump to the chamber in which the copy sheet is disposed and also after the valve 112 has been opened to connect said vacuum pump to the empty chamber which, subsequently, is to receive the light-sensitive sheet thereby effecting intimate engagement of the copy sheet with the adjacent face of the plate 92 and similar engagement of the frosted surface of the plate 39 with the plate 36, the operator proceeds with the focusing operation in the following manner.

The camera is shown in Fig. 1 as so arranged that the lamps in the respective housings 104 illuminate the copy sheet in the copyholder frames when one of the switches 32d, Fig. 13, is actuated, the other switch 32d being utilized for operating the motor for the hereinbefore described vacuum pump. Accordingly, with said lamps thus energized, the operator releases the latch 53 and moves the hood 52 to its open position. As a result, provided that the opaque sheet 38 is in open position as shown in Fig. 2, the image of the copy sheet, as produced by the objective lens 61, after the shutter mechanism thereof is actuated, becomes visible on the frosted surface of the plate 39. By adjustment of the hand wheels 19 for the respective carriages C and C1, proper size and focus of the projected image is obtained. Thereupon, the hood 52 is moved to its closed position and the respective hand wheels 25 for the carriages C and C1 are actuated to positively secure the latter in the respective positions thereof to which they were adjusted as just described.

The next operation involves disposition of a sheet of sensitized material in the negative carrier N. Assuming that the end of the camera toward the left, Fig. 4, is in a dark room, the aforesaid opaque sheet 38 is left in its open position and the handles 43 are grasped whereupon said negative carrier N is elevated slightly and then removed from the frame F. At this time, the latches 35e are released and the carrier sections 34, 35 opened so that the sheet of sensitized material may be disposed in operative position. Thereupon, the carrier sections are closed and latched, the springs 42 thereafter biasing the plate 39 from left to right, Fig. 14, to positively hold said sheet of sensitized material in engagement with the plate 36. Finally, the latched carrier sections comprising the negative carrier N are returned to operative position with the frame F as shown in Fig. 14. The valves 112 and 112a being open to exhaust air from the chamber for the copy sheet and the chamber for the light-sensitive sheet and the lamps in the respective hoods 104 remaining energized, the shutter mechanism of the objective lens 61 is actuated to produce the desired exposure on said light-sensitive sheet.

Should the end of the camera toward the left, Fig. 1, not be in a dark room, the negative carrier N may be removed from the frame F as described, transported to a dark room and there have a light-sensitive sheet associated therewith. Thereupon, the opaque sheet 38 may be moved to its inward position wherein it obstructs the passage of light to said light-sensitive sheet through the transparent plate 36. Thereafter, the "loaded" negative carrier N is returned to and associated with the camera. Just before the exposure is to be made, the opaque sheet 36 is moved to open position to thereby open the light path to the light-sensitive sheet by way of the objective lens 61.

Referring to Fig. 2, I have shown the camera of my invention as adapted for "through" projection rather than "reflecting" projection as illustrated in Fig. 1. The plates 82 and 92 of the copyholder are formed from transparent material and, therefore, when the copy sheet is a "transparency" as known in the art or when it is a positive, said last named copy sheet, preferably surrounded by a suitable mask, may be associated with the copyholder as described and the hoods 104 swung to the rear position shown in Fig. 2 in order to project the image by "through" projection. With respect to this, it will be understood that focusing, loading of the negative carrier, etc. are performed in the same manner as hereinbefore described in connection with Fig. 1.

It is a feature of my invention that the camera may be modified to render it susceptible of use as a vacuum printing frame. Thus, by reference to Fig. 4, it will be noted that the bellows 67, the lazy tongs 70 and the lens plate 60 have been removed from the camera. (The manner of effecting such removal will be hereinafter described.)

When this has been done, the negative carrier N may be removed and two sheets disposed therein—a light-sensitive sheet and a copy sheet, either a positive or negative, from which a contact print is to be made, the light-sensitive sheet being disposed in contact with the plate 39 and the copy sheet in engagement with the plate 36. Then, after the negative carrier N has been reassociated with the frame F, the chamber containing said sheets should be subjected to the vacuum effect by opening the valve 112a. As shown in Fig. 4, a reflector 115 carrying a high-powered electric lamp 116 is suspended on the aforesaid plate 59 so that said lamp 116 faces the frame F. When this lamp 116 is energized, the two sheets last referred to are properly illuminated to thereby produce an image on the light-sensitive sheet by a contact printing operation.

Should a larger print be desired than is obtainable with the negative carrier N, the two sheets as described above may be disposed between the plates 82 and 92 of the copyholder and subjected to a vacuum effect by opening the valve 112. Then, with the reflector 115 and lamp 116 facing the opposite way from that shown in Fig. 4 but supported on the plate 59, the contact printing operation may be effected as will be understood. If desired, the illuminating action of the lamp 116 may be supplemented by the similar action of the lamps in the respective hoods 104.

As stated above, the frosted surface of the plate 39 is in engagement with the plate 36 during the focusing operation. Subsequently, when the light-sensitive sheet is disposed between the plates 36 and 39, the active or coated side thereof engages the plate 36. The focal plane, then, both for focusing and exposure, coincides with the surface of the plate 36 which faces the plate 39. The plate 39 is biased toward the plate 36 and, therefore, besides serving in the focusing operation as described above, said plate 39 serves as a compensating back for light-sensitive sheets having different thicknesses. The foregoing are important features of the invention.

Another important feature of the invention relates to the copyholder construction. As stated, both of the plates 82 and 92 are transparent and the vacuum effect therebetween is maintained for either "reflecting" or "through" projection. Further, such vacuum effect is maintained without using a rubber blanket and, as known in the art, this blanket must be removed when the copyholder is to be used for "through" projection.

A feature of distinct importance relative to the invention resides in the fact that my novel camera is of the "knock-down" type. However, there are other features that relate to cameras generally and, therefore, except as limited in the appended claims, the invention is not to be restricted to a camera of the "knock-down" type.

As regards this type of camera, it is important that the following be noted:

The frame F3 may be detached from the frame F2 when the latches 95, Fig. 5, are released. The frame F2 may be removed from the collar C2 when the screw 25 is retracted, Fig. 3. The lamp hoods 104 may readily be detached from the respective arms 102.

Upon release of the latch 63, Fig. 2, the lens plate 60 may be removed from the plate 59. Further, the latches 66, Fig. 4a, and the latches 69, Fig. 14, may be released to permit removal of the plate 64 and wall 28 from plate 59 and frame F, respectively. Completion of this operation effects removal of the hood assembly from its operative position. Thereupon, the screw 25, Fig. 3, may be operated to remove the frame F1 from the collar C1.

The negative carrier N is removable from the frame F1 in the manner hereinbefore described and, upon release of the screw 25, Fig. 14, said frame F may be removed from the collar C.

Thereafter, the shaft 12, Fig. 8, may be rotated to release the section 12a thereof from the disk 14. When this is done, the structure 1 separates into its two sections 1a, 1b as shown in Fig. 3.

The sections 1a and 1b, then, together with the parts permanently associated therewith may be arranged as shown in Figs. 11 and 12. Each of the collars C and C2 carries a pair of the clips 21 and these are utilized, when the legs 9 are folded as shown in Figs. 11 and 12, to hold said legs in intended collapsed position. As will be understood, each pair of legs 9 may be folded after the associated latching member 6 is retracted.

Obviously, the other disassembled parts may be readily packed, along with the assemblies of Figs. 11 and 12, in one or more containers and transported to a desired destination where the camera may be quickly and easily reassembled for operative use. The camera of my invention, then, is well adapted for use by the military services. However, its use is not to be so restricted.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the character described, a tubular support, pivoted legs at each end of said support, means forming a detachable connection between the ends of said support, said means comprising end sections of said support which engage each other in telescopic relation, means for alining said end sections, and mechanism for releasably retaining said end sections in said relation, said mechanism comprising a rotatable retaining member extending through said tubular support and terminating exteriorly of one end thereof in an actuating wheel.

2. In a device of the character described, a support, means for holding said support in a horizontal position, a collar carried by said support and having a flat upper face, a frame seated on said collar face, means for detachably securing said frame to the flat upper face of said collar, said collar being the sole support for said frame which extends substantially equal distances beyond the respective sides of said support, said last named means comprising a screw extending through the lower section of said frame and being threaded into said collar, and an alining pin associated with said frame section and said collar.

3. In a device of the character described, a tubular support, pivoted legs at each end of said support, said tubular support comprising sections adapted to engage each other in telescopic relation, and mechanism for drawing said sections toward each other and for retaining them in said relation, said mechanism being operative to release said sections so that each of the latter together with its pivoted legs becomes a separate unit.

4. In a device of the character described, a tubular support, pivoted legs at each end of said support, said tubular support comprising sections adapted to engage each other in telescopic relation, and mechanism for retaining said sections in said relation, said mechanism comprising a nut fixed in one of said sections and a shaft rotatable in the other section, said shaft comprising a threaded section coactable with said nut.

STEPHEN N. WEKEMAN.